US011630809B2

(12) United States Patent
Mohen et al.

(10) Patent No.: US 11,630,809 B2
(45) Date of Patent: *Apr. 18, 2023

(54) METHOD AND SYSTEM FOR USING MICRO OBJECTS

(71) Applicant: Open Text Corporation, Waterloo (CA)

(72) Inventors: Michael Mohen, Millington, MD (US); David Humby, Richmond (CA); Satyapal P. Reddy, San Ramon, CA (US)

(73) Assignee: OPEN TEXT CORPORATION, Waterloo (CA)

( * ) Notice: Subject to any disclaimer, the term of this patent is extended or adjusted under 35 U.S.C. 154(b) by 46 days.

This patent is subject to a terminal disclaimer.

(21) Appl. No.: 17/323,743

(22) Filed: May 18, 2021

(65) Prior Publication Data

US 2021/0271647 A1 Sep. 2, 2021

Related U.S. Application Data

(63) Continuation of application No. 15/998,884, filed on Aug. 16, 2018, now Pat. No. 11,016,948, which is a continuation of application No. 14/755,537, filed on Jun. 30, 2015, now Pat. No. 10,089,325.

(51) Int. Cl.
*G06F 16/182* (2019.01)
*G06F 16/951* (2019.01)
*G06F 16/903* (2019.01)

(52) U.S. Cl.
CPC .... *G06F 16/1827* (2019.01); *G06F 16/90335* (2019.01); *G06F 16/951* (2019.01)

(58) Field of Classification Search
CPC .. G06F 3/0481; G06F 17/30; G06F 17/30011; G06F 21/31; G06F 21/62; G06F 16/1827; G06F 16/90335; G06F 16/951
See application file for complete search history.

(56) References Cited

U.S. PATENT DOCUMENTS

| | | | |
|---|---|---|---|
| 10,089,325 B1 * | 10/2018 | Mohen | G06F 16/90335 |
| 11,016,948 B2 * | 5/2021 | Mohen | G06F 16/90335 |
| 2007/0005795 A1 | 1/2007 | Gonzalez | |
| 2011/0167414 A1 | 7/2011 | Lattner et al. | |
| 2012/0011134 A1 | 1/2012 | Travnik | |
| 2012/0110117 A1 | 5/2012 | Koreeda | |
| 2012/0113218 A1 | 5/2012 | Sasamoto | |
| 2014/0165127 A1 | 6/2014 | Bialik et al. | |

(Continued)

OTHER PUBLICATIONS

Office Action for U.S. Appl. No. 14/755,537, dated Aug. 8, 2017, 12 pgs.

(Continued)

*Primary Examiner* — Wilson Lee
(74) *Attorney, Agent, or Firm* — Sprinkle IP Law Group

(57) ABSTRACT

In general, embodiments of the technology relate to a method and system for using micro objects to manage content. More specifically, embodiments of the technology relate to using micro objects to change and/or extend the functionality of the content management system such that the manner in which actions are applied to objects varies based the context of the request that specified an action to be performed on an object.

20 Claims, 7 Drawing Sheets

(56) References Cited

U.S. PATENT DOCUMENTS

2015/0200945 A1* 7/2015 Edson .................. H04L 65/403
726/28
2016/0314550 A1 10/2016 Follis
2018/0365237 A1 12/2018 Mohen

OTHER PUBLICATIONS

Office Action for U.S. Appl. No. 14/755,537, dated Dec. 22, 2017, 17 pgs.
Office Action for U.S. Appl. No. 15/998,884, dated Apr. 2, 2020, 13 pgs.
Office Action for U.S. Appl. No. 15/998,884, dated Sep. 29, 2020, 20 pgs.
Notice of Allowance for U.S. Appl. No. 15/998,884, dated Jan. 28, 2021, 4 pgs.

* cited by examiner

METHOD AND SYSTEM FOR USING MICRO OBJECTS

CROSS-REFERENCE TO RELATED APPLICATION(S)

This application is a continuation of, and claims a benefit of priority under 35 U.S.C. § 120 from, U.S. patent application Ser. No. 15/998,884 filed Aug. 16, 2018, issued as U.S. Pat. No. 11,016,948, entitled "METHOD AND SYSTEM FOR USING MICRO OBJECTS," which is a continuation of, and claims a benefit of priority under 35 U.S.C. § 120 from, U.S. patent application Ser. No. 14/755,537 filed Jun. 30, 2015, issued U.S. Pat. No. 10,089,325, entitled "METHOD AND SYSTEM FOR USING MICRO OBJECTS," which are fully incorporated by reference herein for all purposes.

BACKGROUND

A significant amount of content is stored in content repositories. The access and manipulation of this content is typically limited to pre-defined constructs and/or methods. When attempts are made to modify the pre-defined constructs and/or methods, such attempts require significant resources and time to implement.

DETAILED DESCRIPTION

Specific embodiments of the technology will now be described in detail with reference to the accompanying figures. In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

In the following description of FIGS. 1-7, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment, which may be implemented in addition to, in conjunction with, or in place of the embodiments described with regard to a corresponding like-named component in any other figure.

In general, embodiments of the technology relate to a method and system for using micro objects to manage content. More specifically, embodiments of the technology relate to using micro objects to change and/or extend the functionality of the content management system such that the manner in which actions are applied to objects varies based the context of the request that specified an action to be performed on an object.

Figure 1:
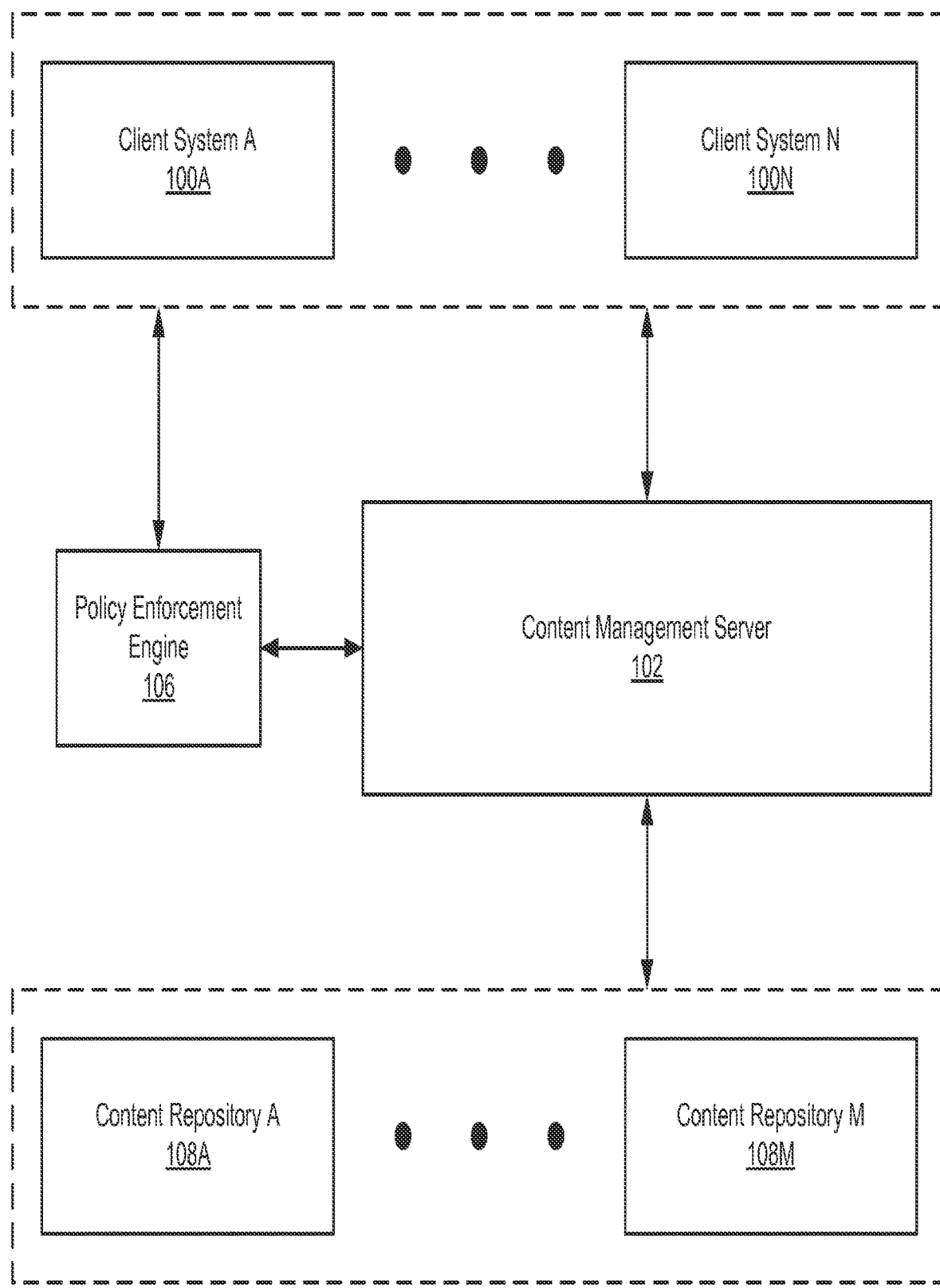
FIG. 1 shows an exemplary system in accordance with one or more embodiments of the technology.

FIG. 1 shows an exemplary system in accordance with one or more embodiments of the technology. The system includes one or more client systems (100A, 100N), a content management server (102), a policy enforcement engine (106), and one or more content repositories (108A, 108M). The aforementioned components may communicate with each other using any known or later discovered communication protocol. Further, the aforementioned components may communicate using any combination of wired and/or wireless connections and wired and/or wireless networks. Each of the aforementioned components is described below.

In one embodiment of the technology, a client system corresponds to any computing system (see e.g., FIG. 7) that includes functionality to issue requests to the content management server (102) and to receive a corresponding response(s) from the content management server after the request has been serviced.

In one embodiment of the technology, each client system may be referred to as a platform, where the platform includes the combination of hardware and software (including the operating system, virtual machines, etc. but excluding applications) executing on the hardware. Each client system may also include one or more applications, where the applications are executing on the platform. In one embodiment of the technology, each platform and/or application may be characterized as public (e.g., the platform is operating on a public computing network or is a publicly accessible computing system) or private (e.g., the platform is operating on a private computing network (e.g., an internal company network) or is a computing system that is provisioned by a company (or another legal entity) for use by the company's employee). Additionally, or alternatively, the platform and/or application may also be characterized based on the level of security measures (e.g., encryption, multi-factor authentication, secure communication protocols, etc.) implemented in the platform and/or application (e.g., a rating scale of 1-5 may be used where 1 is unsecure and 5 is the highest level of security). Each platform and/or application may be characterized using other characterization schemes without departing from the technology. Further, each platform and/or application may be characterized using a combination of characterization schemes (e.g., a platform may be characterized as private, level 3 security).

Figure 4:
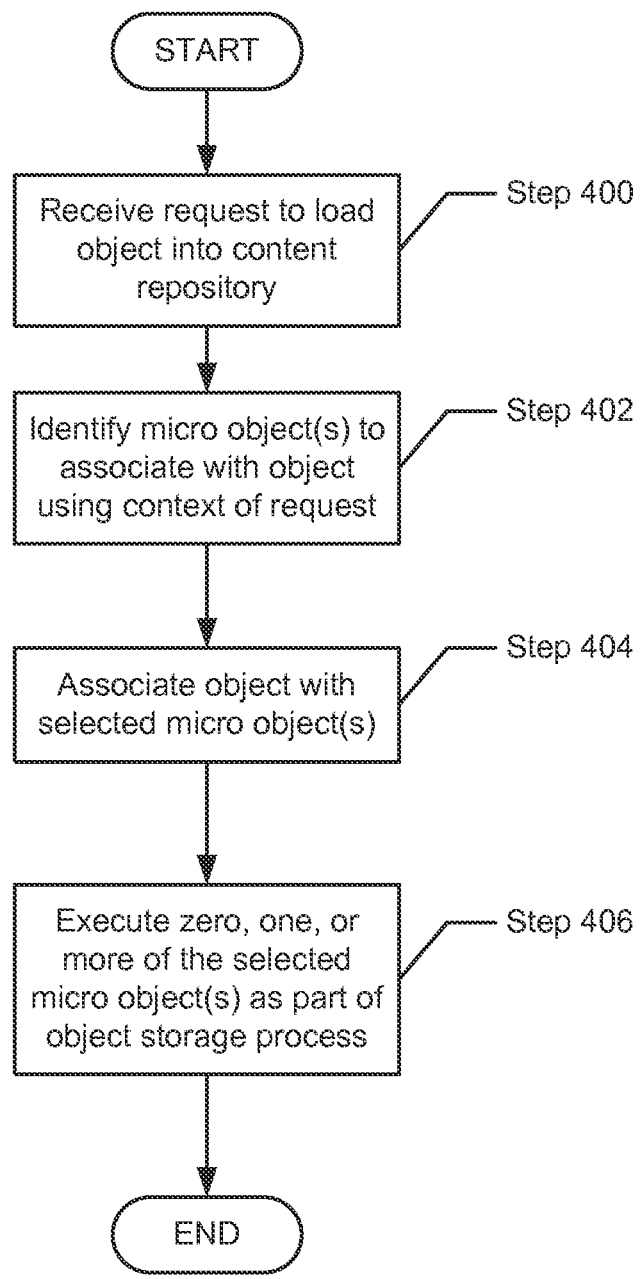
FIG. 4 shows a method for associating micro objects with objects in accordance with one or more embodiments of the technology.
Figure 5:
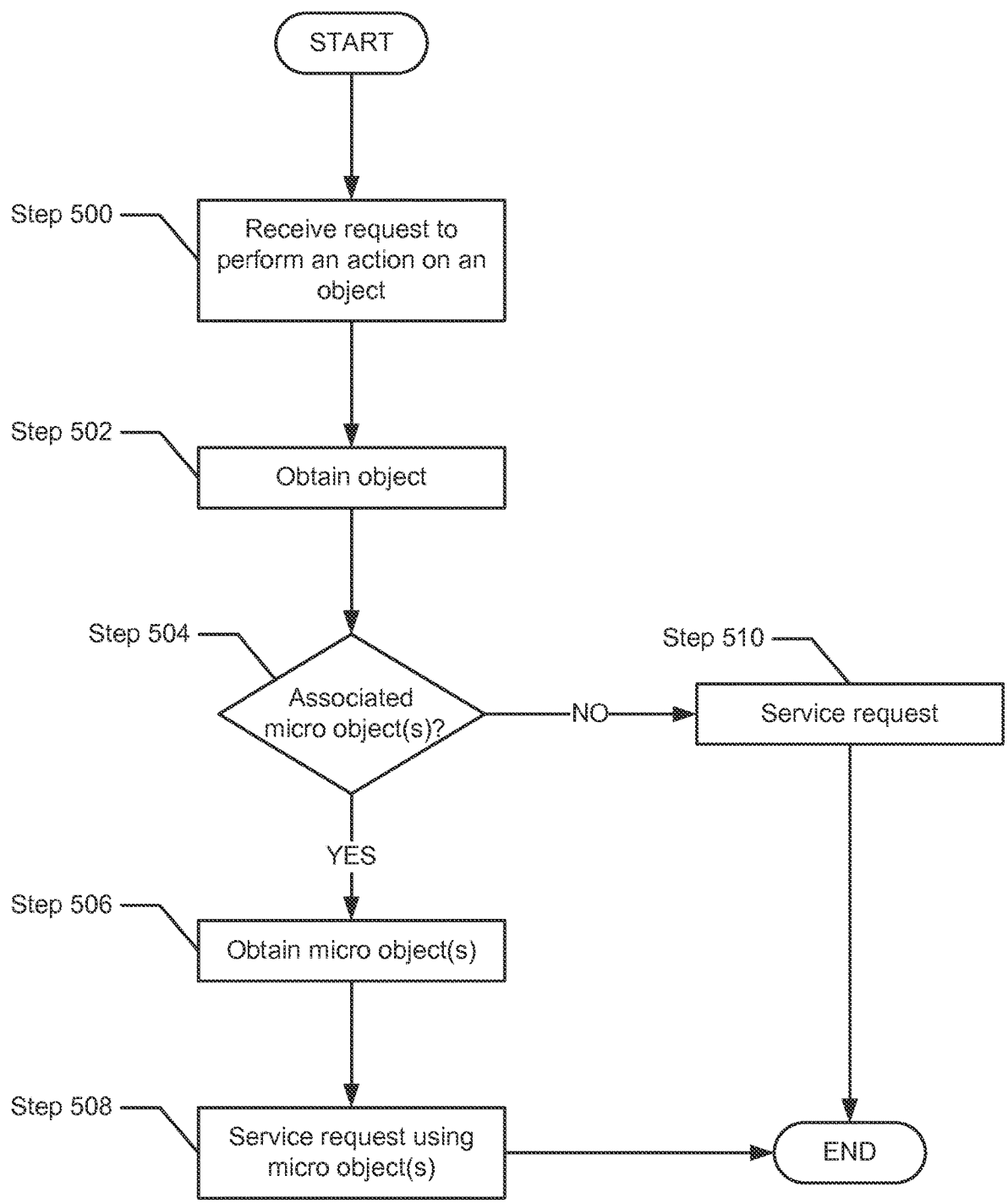
FIG. 5 shows a method for servicing requests in accordance with one or more embodiments of the technology.
Figure 6:
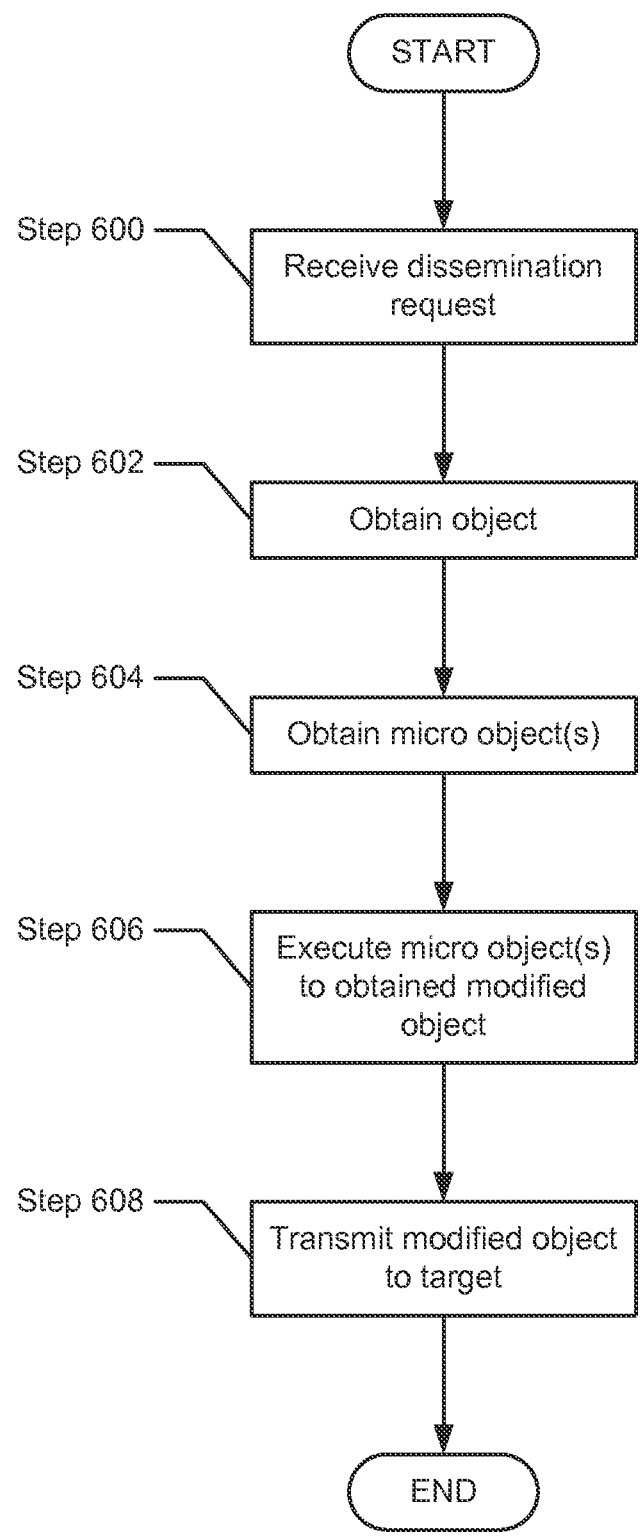
FIG. 6 shows a method for servicing dissemination requests in accordance with one or more embodiments of the technology.

Continuing with the discussion of FIG. 1, the content management server includes functionality to perform the methods shown in FIGS. 4-6. The content management server may also include functionality to perform various actions (e.g., read, write, delete, modify, send, etc.) on the objects stored in the content repositories when servicing requests from the client systems (see e.g., FIGS. 4-6). In one embodiment of the technology, the content management service includes functionality to identify the micro object(s)

associated with the object that is the subject of a request and, at least in part, service the request using the identified micro object(s) (see e.g., FIGS. 4-6).

Figure 7:
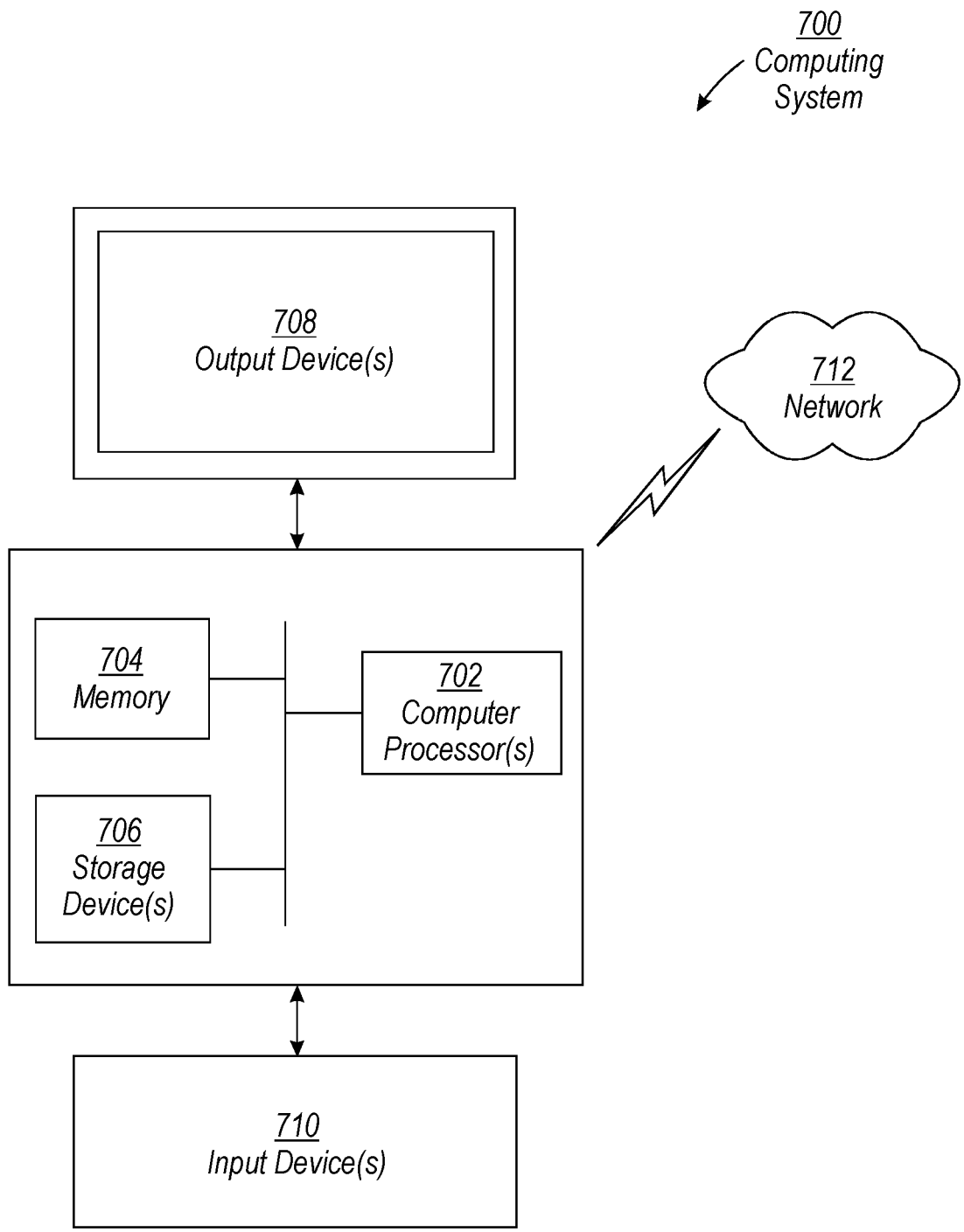
FIG. 7 shows a computing system in accordance with one or more embodiments of the technology.

The content management server may be implemented using one or more computing systems (see e.g., FIG. 7). Additional detail about the operation of the content management server is provided in FIGS. 4-6.

In one embodiment of the technology, each content repository (108A, 108M) includes persistent storage (e.g., solid state storage, magnetic storage, optical storage, any other type of persistent storage or any combination thereof) in which objects (see e.g., FIG. 2) and micro objects (see e.g., FIG. 3) are stored.

Continuing with the discussion of the content repositories, each of the content repositories may store objects and micro objects using any known or subsequently discovered mechanism. The following describes various examples of the mechanisms that may be used to store objects and micro objects. The examples are not intended to limit the technology. In a first example, the content repository (108A, 108M) may be a set of magnetic hard disks. In a second example, the content repository (108A, 108M) may be implemented using a computer cluster that is executing a distributed file system. In a third example, the content repository (108A, 108M) may be implemented using a network file server and one or more block-storage devices (i.e., as a Storage Area Network).

The technology is not limited to the architecture of the system shown in FIG. 1.

Figure 2:
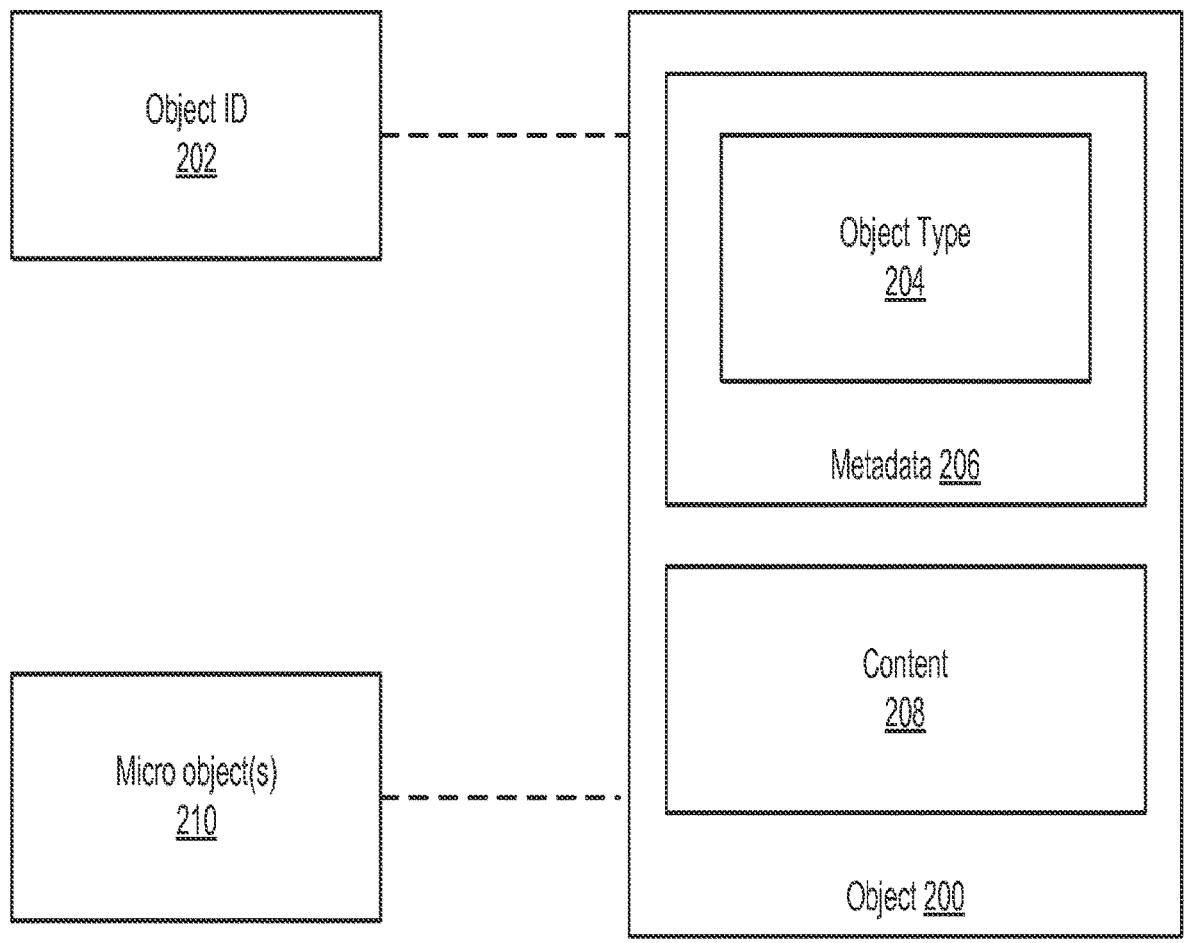
FIG. 2 shows an exemplary object in accordance with one or more embodiments of the technology.

FIG. 2 shows an exemplary object in accordance with one or more embodiments of the technology. The object (200) corresponds to a combination of content (208) and the metadata (206) associated with the content. The metadata (206) may include the object type (204) as well as any other metadata associated with the object. Examples of metadata may include, but are not limited to, author, content name, creation time, creation date, size of object, modification time, modification date, object format (i.e., the format of the content (208), e.g., portable document format (PDF), MPEG-4, .txt., etc.). With respect to the content, the content may correspond to any type of data that may be stored in the content repository. Examples of content may include, but are not limited to, text files, audio files, image files, and/or audio-visual files.

In one embodiment of the technology, each object (200) may be identified using an object ID (202). The object ID uniquely identifies the object in the content repository. The object ID may be any combination of numbers, letters, and symbols.

In one embodiment of the technology, the metadata and content associated with a given object may be stored in a single location. Alternatively, the metadata associated with an object may be stored in a first location and the content associated with a given object may be stored in a second location, where the first and second locations may be in the same or different content repositories.

In one embodiment of the technology, an object type (204) is a user-defined composite datatype that encapsulates a data structure along with the functions and procedures needed to manipulate the data. Accordingly, when an object is specified as being of a given object type, the metadata (206) and the content (208), by default, may only be manipulated in accordance with the functions and procedures specified for the object type. In one embodiment of the technology, each object (200) is associated with a single object type.

In one embodiment of the technology, each object (200) may be associated with zero, one, or more micro objects (210). The association between an object and a micro object may be explicitly defined within the object (200) and/or the micro object (210). Alternatively, the content management system may maintain a data structure(s) that tracks the association of objects to micro objects. In another embodiment of the technology, the content management system includes functionality to determine zero, one or more micro objects that are associated with an object using a function that takes as input the object ID of the object and a context of the request (see e.g., FIGS. 4-6) to determine zero, one or more objects that are associated with the object for the particular context. In one embodiment of the technology, a micro object may be associated with an object when it is initially being stored in the content repository (see e.g., FIG. 4), when the object is in the content repository, and when the object is being exported (or sent) outside of the content repository (see e.g., FIG. 6). Further, micro objects may be disassociated from an object at any time after the micro object has been associated with the content object. Further, new micro objects may be added to the content repository any at time. Once a micro object has been added to the content repository, the micro object may be associated with zero, one or more objects.

In one embodiment of the technology, if multiple micro objects are associated with a single object, then the content management system may include functionality to determine an appropriate order in which to execute the micro objects associated with the object. Additional details related to the processing of micro objects are described below in FIGS. 4-6.

Additional detail about micro objects is described in FIG. 3 below.

Figure 3:
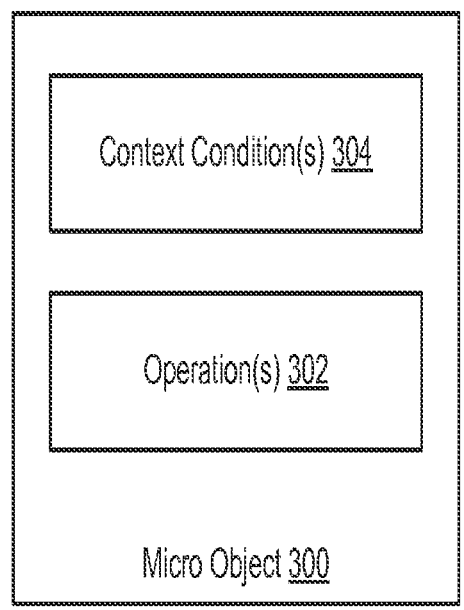
FIG. 3 shows an exemplary micro object in accordance with one or more embodiments of the technology.

FIG. 3 shows an exemplary micro object in accordance with one or more embodiments of the technology. The micro object (300) includes one or more context condition(s) (304) and one or more operation(s) (302). The micro object may specify additional or other information without departing from the technology.

In one embodiment of the technology, the context condition(s) specify the context in which the operation in the micro object is to be executed. The context condition may be specified at any level of granularity. In one embodiment of the technology, the context condition may specify that the micro object is associated with all objects in the content repository. In other embodiments of the technology, the context condition may specify one or more of the following: (i) the object, e.g., using the object ID or using an expression (e.g., a regular expression) that may be used to identify the object (e.g., if content in the object is an audio-visual file); (ii) the action (or set of actions); (iii) a characterization associated with the source platform (i.e., the platform from which a request was issued (see e.g., FIG. 4, step 400)); (iv) a characterization associated with the source application (i.e., the application from which a request was issued (see e.g., FIG. 4, step 400)); (v) the user that issued the request; (vi) a characterization associated with a target platform (i.e., the platform on which the object will be viewed if the request is successfully serviced); (vii) source content repository (i.e., the content repository in which the object is currently stored); and (viii) target content repository (i.e., the content repository in which the object will be stored if the request is successfully serviced). The context condition may specify additional and/or other information without departing from the technology.

In one embodiment of the technology, the micro object also includes one or more operations (302). The operations correspond to executable code that is executed when the content management service is servicing the request. The operation, when executed, may: (i) modify metadata of the object; (ii) modify the content of the object; (iii) determine whether the action can be performed based on the context of the request, the content of the object and/or the metadata of the object; (iv) insert executable code into the object or associate executable code with the object (see e.g., FIG. 5); (v) initiate execution of a timer (either an incrementing or a decrementing timer) until the timer elapses, at which time the operation is performed (where the operation corresponds to one of the operations in (i)-(iv)).

In one embodiment of the technology, the operations in the micro object may augment or override the functions and procedures associated with an object type of the object. Said another way, the functions and procedures that govern how the object of a given object type may be managed and/or manipulated may be augmented or overridden by one or more micro objects associated with the object.

FIGS. 4-6 show flowcharts in accordance with one or more embodiments of the technology. While the various steps in the flowcharts are presented and described sequentially, one of ordinary skill will appreciate that some or all of these steps may be executed in different orders, may be combined or omitted, and some or all of the steps may be executed in parallel.

FIG. 4 shows a method for associating micro objects with objects in accordance with one or more embodiments of the technology. More specifically, FIG. 4 shows a method for storing objects in a content repository in accordance with one or more embodiments of the technology. The method shown in FIG. 4 may be performed, for example, when a set of objects is initially being loaded into the content repository.

In step 400, a request to load an object is received. The request may include an object ID and the content repository to which the object is to be loaded.

In step 402, the context of the request is obtained and used to identify an ingest micro object. More specifically, the content management service determines the context of the request (i.e., the object ID, action=store object, content repository in which the document will be loaded). Using this context, the content management service identifies an ingest micro object, which includes a content condition that specifies action=store object.

In step 404, the ingest micro object is associated with the object.

In step 406, the micro object associated with the object is executed. More specifically, the operation in the micro object is executed. The operation in the ingest micro object may use the context of the request to determine whether to permit loading of the object into the content repository. If the result of executing the operation is that the object is permitted to the loaded into the content repository specified in the request, then the object is stored in the content repository; otherwise, the request fails (i.e., the object is not loaded into the content repository).

In one embodiment of the technology, multiple micro objects may be identified and associated with an object prior to step 406. For example, in addition to an ingest micro object, the object may be associated with one or more micro objects that may modify the metadata and/or the content of the object prior to the object being loaded into the content repository. In such scenarios, some or all of the micro objects may be executed prior to loading the object.

Examples 1 and 2 below describe examples of the method shown in FIG. 4.

FIG. 5 shows a method for servicing requests in accordance with one or more embodiments of the technology.

In step 500, a request is received by the content management service from a requesting entity (e.g., a client system). In one embodiment of the technology, the request includes an object ID and an action(s) to be performed on (or with) the object (or a portion thereof) associated with the object ID. The request may include additional information (e.g., parameters associated with the action) without departing from the technology. The action may correspond to any action that may be performed on any portion of the object (i.e., on the content or metadata, see e.g., FIG. 2). Examples of actions may include, but are not limited to, read, write, modify, delete, send, and move. In one embodiment of the technology, the request may specify a set of objects using, e.g., object IDs or a regular expression.

In the event that the request specifies multiple objects and/or multiple actions, steps 502-510 may be performed for every <object ID, action> pair.

In step 502, the object identified in the step 500 is obtained.

In step 504, a determination is made about whether the object is associated with any micro objects. In one embodiment of the technology, if the object includes specific references to micro objects, then the determination in step 504 includes: (i) obtaining all references to micro objects from the object; (ii) obtaining the referenced micro objects from the content repository; (iii) obtaining the context associated with the request; and (iv) evaluating, using the context obtained in (iii), the context conditions for each of the micro objects to determine a set of micro objects that need to be executed as part of the servicing of the request. If the set obtained in step (iv) is not a null set, then the process proceeds to step 506; otherwise, the process proceeds to step 510.

In another embodiment of the technology, if the object does not include a specific reference to micro objects, then the determination is step 504 includes: (i) obtaining all references to micro objects using one or more data structures (or mappings) maintained by the content management service, where the data structures or mappings are used to determine the set micro objects associated with the object; (ii) obtaining the referenced micro objects from the content repository; (iii) obtaining the context associated with the request; (iv) evaluating, using the context obtain in (iii), the context conditions for each of the micro objects to determine a set of micro objects that need to be executed as part of the servicing of the request. If the set obtained in step (iv) is not a null set, then the process proceeds to step 506; otherwise, the process proceeds to step 510.

In one embodiment of the technology, the set of micro objects to execute may include any micro object whose context condition is satisfied using all or a portion of the context of the request. Accordingly, the set of micro objects may include micro objects that apply to a wide set of objects (e.g., all objects with a specific object type) and micro objects that are only applicable to a single object (or small number of objects) in the content repository.

In step 506, the micro objects in the set of micro objects determined in step 504 are obtained from the content repository.

In step 508, the request is serviced, where servicing the request includes executing the micro objects and performing the action (unless the action is not permitted). One or more of the micro objects may be executed in order to determine whether the action may be performed. Further, one or more of the micro objects may be executed to modify content or metadata in the object prior to performing the action. Finally, one or more micro object may be executed on the result of performing the action. Once the request has been serviced (i.e., the action is ultimately performed or the action is not performed), the result of servicing the request is provided to the requesting entity. In one embodiment of the technology, the content management system includes functionality to determine the order in which to execute the micro objects.

In step 510, the request has been serviced without the execution of any micro objects. The result of servicing the request (i.e., the action is ultimately performed or the action is not performed) is provided to the requesting entity.

Example 3 below is an example of the method in FIG. 5.

FIG. 6 shows a method for servicing dissemination requests in accordance with one or more embodiments of the technology.

In step 600, the content management system receives a dissemination request (i.e., a request to send a copy of the object to a location that is external to the content repository). An example of a dissemination request may be a request by a user to email an object to a 3$^{rd}$ party.

In step 602, the object is obtained from the content repository using, for example, the object ID in the dissemination request.

In step 604, one or more micro objects are obtained based on the context of the request.

The micro objects that are obtained in step 604 may be determined in the same manner as described above with respect to step 504 in FIG. 5. In one embodiment of the technology, at least the tracking micro object is obtained in step 604.

In step 606, at least the tracking micro object is executed to obtain a modified object. More specifically, in one embodiment of the technology, executing the tracking micro results in a piece of code being associated with or embedded within the object. The purpose of this code is to enable the content management system to track, using the policy enforcement server, the dissemination of the object and, if necessary, enforce a policy on the object. For example, the object may be associated with a policy that only permits the content of the object to be viewed for 30 days. In this example, the code that is associated with or embedded within the object includes functionality to communicate with the policy enforcement server. This communication includes receiving a command to prevent access to the content of the object on the client system after 30 days from receipt of the object by the client system. Upon receipt of such a command, the code associated with or embedded within the object executes a function that disables access to the content of the object.

In another embodiment of the technology, the object that is to be disseminated may also be associated with a redaction micro object. In such a scenario, the metadata and/or content of the object may be redacted as a result of the execution of the redaction micro object.

Other micro objects may be associated with that object that is to be disseminated without departing from the technology.

Continuing with the discussion of FIG. 6, in step 608, the modified object is transmitted to the target client system.

The following section describes examples in accordance with one or more embodiments of the technology. The examples are not intended to limit the scope of the technology.

Example 1—Ingesting New Objects

Consider a first scenario in which a user is attempting to load an object of object type=personnel file into a public repository. When the content management system receives this load request, the content management system identifies the following context for the request: (i) object type=personnel file, (ii) action=store object; and (iii) target content repository=public repository. Based on this context, the ingest micro object and the redaction micro object are identified. The ingest micro object is identified because the action=store object and the redaction micro object is identified because object type=personnel file and action=store object. These micro objects are subsequently associated with the object that is subject of the request.

In the instant example, the operation in the ingest object is performed first. The operation in the ingest object uses the context for the request as input in order to determine whether loading of the object into the content repository is permitted. In this example, because the object type=personnel file and target content repository=public repository, the result of the operation is to deny the loading of the object as personnel files are not be loaded into public content repositories. In view of the result of the operation, the object is not loaded into the content repository and the redaction micro object is not executed. The entity that issued the request to load the object may also be notified that the request failed.

Consider a second scenario in which a user is attempting to load an object of object type=personnel file into a private human resources repository. When the content management system receives this load request, the content management system identifies the following context for the request: (i) object type=personnel file, (ii) action=store object; (iii) target content repository=private human resources repository. Based on this context, the ingest micro object and the redaction micro object are identified. The ingest micro object is identified because the action=store object and the redaction micro object is identified because object type=personnel file and action=store object. These micro objects are subsequently associated with the object that is subject of the request.

In the instant example, the operation in the ingest object is performed first. The operation in the ingest object uses the context for the request as input in order to determine whether loading of the object into the content repository is permitted. In this example, because the object type=personnel file and target content repository=private human resources repository, the result of the operation is to allow the loading of the object as personnel files are permitted to be loaded into the private human resource content repository.

Next the redaction micro object is executed. Specifically, in this example, the operation in the redaction micro object, when executed, redacts all social security numbers in the content of the object in order to obtain a modified object. The resulting modified object is subsequently loaded into the private human resource content repository. The entity that issued the request to load the object is subsequently notified that the request succeeded.

Example 2—Object Retention Management

Consider a scenario in which a user is attempting to load an object of object type=email message type into a content repository. When the content management system receives this load request, the content management system identifies the following context for the request: (i) object type=email message and (ii) action=store object. Based on this context, the ingest micro object and a data retention micro object are identified. The ingest micro object is identified because the action=store object and the redaction micro object are identified because object type=email message and action=store object. These micro objects are subsequently associated with the object that is the subject of the request.

In the instant example, the operation in the ingest object is performed first. The operation in the ingest object uses the context for the request as input in order to determine whether loading of the object into the content repository is permitted. In this example, because the object type=email message, the result of the operation is to allow the loading of the object as email messages are permitted to be loaded into the content repository.

Next the data retention micro object is executed. Specifically, in this example, objects of object type=email message are to be retained in the content repository for two years from storage date. Accordingly, once the object is stored in the content repository, the operation is the micro object executed. Specifically, execution of the operation starts a countdown timer. Once two years has elapsed, the object (i.e., the email message) is deleted from the repository. Those skilled in the art will appreciate that other object types may include different retention times without departing from the technology.

Example 3—Object Access

Consider a scenario in which the content management system receives a request to view content of an object with an object type=personnel file. Upon receiving the request, the content management system obtains the following context information: (i) user=Bob Smith; (ii) object type=personnel file; (iii) action=view content.

The content management system determines that there are five micro objects that are associated with the object but only one micro object, the access micro object, has a context condition that is satisfied by the context of the request.

The access micro object is subsequently obtained and executed. Specifically, the operation in the access micro object determines whether the user attempting to access the request is the same user that is the subject of the object (i.e., is the user trying to access their own personnel file). In the instant example, the user is Bob Smith and the object is a personnel file for Bob Smith. Accordingly, the result of executing the operation is a denial of action. In addition, in the event of a denial, the operation also issues a notification to the Vice President of Human Resources to alert them that an individual has tried to access their own personnel file.

Embodiments of the technology may be implemented on a computing system. Any combination of mobile, desktop, server, embedded, or other types of hardware may be used. For example, as shown in FIG. 7, the computing system (700) may include one or more computer processor(s) (702), associated memory (704) (e.g., random access memory (RAM), cache memory, flash memory, etc.), one or more storage device(s) (706) (e.g., a hard disk, an optical drive such as a compact disc (CD) drive or digital versatile disc (DVD) drive, a flash memory stick, etc.), and numerous other elements and functionalities. The computer processor(s) (702) may be an integrated circuit for processing instructions. For example, the computer processor(s) may be one or more cores, or micro-cores of a processor. The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (712) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s) (706). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code, that when executed by a processor(s), is configured to perform embodiments of the technology.

Further, one or more elements of the aforementioned computing system (700) may be located at a remote location and connected to the other elements over a network (712). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for servicing requests, the method comprising:
    receiving, from a requesting entity, a request to perform an action on a managed object of a content management system;
    obtaining the managed object from a content repository based on the request;
    determining that the managed object is associated with a context aware object stored in the content repository, the context aware object comprising:
        an operation comprising executable code including context instructions for the managed object and to be executed by the content management system when servicing the request, and
        a context condition that specifies the context in which the operation is to be executed by the content management system;
    determining whether the context condition of the context aware object is satisfied;

if the context condition of the context aware object is satisfied, servicing the request using the executable code of the context aware object; and if the context condition of the context aware object is not satisfied, servicing the request without using the executable code of the context aware object.

2. The method of claim 1, further comprising:

determining that the managed object is associated with an additional context aware object, wherein the additional context aware object is stored in the content repository, and wherein servicing the request comprises using the context aware objects.

3. The method of claim 2, wherein servicing the request comprises:

executing a first operation specified in the context aware object on the managed object to obtain a first modified object; and executing a second operation specified in the additional context aware object on the first modified to obtain a second modified object.

4. The method of claim 3 wherein the first operation comprises redacting at least a portion of content in the managed object.

5. The method of claim 2, wherein at least one of the context aware objects defines an operation for moving the managed object from a source cloud system to a target cloud system.

6. The method of claim 1, wherein servicing the request comprises executing the code for the operation to perform the operation based on the context of the request satisfying the context condition.

7. The method of claim 6, wherein performing the operation comprises modifying at least a portion of the managed object to obtain a modified object, wherein servicing the request comprises performing the action on the modified object.

8. The method of claim 6, wherein performing the operation comprises:

determining that a first user that issued the request is not authorized to perform the action on the managed object; and based on the determination preventing the action from being performed on the managed object.

9. The method of claim 8, wherein performing the operation further comprises notifying a second user that the first user is attempting to perform the action on the managed object.

10. The method of claim 1, wherein the context for the request is based, at least in part, on the managed object, the action, and a user associated with the request.

11. The method of claim 1, wherein the context for the request is based, at least in part, on an object type of the managed object.

12. The method of claim 1, wherein the context for the request is based, at least in part, on the action.

13. The method of claim 1, wherein the action is one selected from a group consisting of a read, write, modify, delete, send, and move.

14. A non-transitory computer readable medium comprising computer readable program code executable to perform a method comprising:

receiving, from a requesting entity, a request to perform an action on a managed object of a content management system;

obtaining the managed object from a content repository based on the request;

determining that the managed object is associated with a context aware object stored in the content repository, the context aware object comprising:

an operation comprising executable code including context instructions for the managed object and to be executed by the content management system when servicing the request, and a context condition that specifies the context in which the operation is to be executed by the content management system;

determining whether the context condition of the context aware object is satisfied;

if the context condition of the context aware object is satisfied, servicing the request using the executable code of the context aware object; and if the context condition of the context aware object is not satisfied, servicing the request without using the executable code of the context aware object.

15. The non-transitory computer readable medium of claim 14, the method further comprising:

determining that the managed object is associated with an additional context aware object, wherein the additional context aware object is stored in the content repository, and wherein servicing the request comprises using the context aware objects.

16. The non-transitory computer readable medium of claim 15, wherein at least one of the context aware objects defines an operation for moving the managed object from a source cloud system to a target cloud system.

17. The non-transitory computer readable medium of claim 14, wherein servicing the request comprises, executing the code for the operation to perform the operation based on the context of the request satisfying the context condition.

18. The non-transitory computer readable medium of claim 14, wherein performing the operation comprises modifying at least a portion of the managed object to obtain a modified object, wherein servicing the request comprises performing the action on the modified object.

19. A system, comprising:

a processor;

a non-transitory computer readable medium;

a content repository storing a managed object and a context aware object;

a content management system coupled to the content repository; and stored instructions translatable by the processor to:

receive, from a requesting entity, a request to perform an action on the managed object;

obtain the managed object from the content repository based on the request;

determine that the managed object is associated with the context aware object, the context aware object comprising:

an operation comprising executable code including context instructions for the managed object and to be executed by the content management system when servicing the request, and a context condition that specifies the context in which the operation is to be executed by the content management system;

determine whether the context condition of the context aware object is satisfied;

if the context condition of the context aware object is satisfied, service the request using the executable code of the context aware object; and if the context condition of the context aware object is not satisfied, service the request without using the executable code of the context aware object.

20. The system of claim 19, wherein the content management system is further programmed to execute the executable code to perform the operation specified in the context aware object.

\* \* \* \* \*